(12) United States Patent
Megiddo

(10) Patent No.: US 7,689,978 B2
(45) Date of Patent: Mar. 30, 2010

(54) SYSTEM AND METHOD FOR AUTONOMIC OPTIMIZATION BY COMPUTER PROGRAMS

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 10/723,850

(22) Filed: Nov. 25, 2003

(65) Prior Publication Data

US 2005/0114849 A1 May 26, 2005

(51) Int. Cl.
*G06F 9/45* (2006.01)
(52) U.S. Cl. .................................... 717/151
(58) Field of Classification Search ......... 717/151–161
See application file for complete search history.

(56) References Cited

U.S. PATENT DOCUMENTS

| | | | | |
|---|---|---|---|---|
| 4,368,509 A | * | 1/1983 | Li | 700/53 |
| 5,333,304 A | * | 7/1994 | Christensen et al. | 714/25 |
| 6,144,954 A | * | 11/2000 | Li | 706/62 |
| 6,226,627 B1 | * | 5/2001 | Polak | 706/14 |
| 6,604,092 B1 | * | 8/2003 | Stewart | 706/47 |
| 6,625,500 B1 | * | 9/2003 | Li | 700/29 |
| 2005/0100209 A1 | * | 5/2005 | Lewis et al. | 382/159 |

* cited by examiner

*Primary Examiner*—Wei Y Zhen
*Assistant Examiner*—Junchun Wu
(74) *Attorney, Agent, or Firm*—Gibb I.P. Law Firm, LLC

(57) ABSTRACT

Disclosed is a system and method for instructing a computer program to self-optimize comprising inputting commands into the computer program and allowing a learning protocol in the computer program to determine an approximately optimal policy of operation of the computer program based on the commands. The commands comprise operational choices for the computer program to select from including an approximately optimal choice for optimizing the operation of the program. The commands comprise a selection command for selecting any function in a list of instructions inputted into the program, wherein the function provides a basis of making an approximately optimal choice. Additionally, the commands comprise a rule command for instructing the computer program of how to make an approximately optimal choice. Moreover, the commands comprise a reward command for instructing the program which of the operational choices results in an approximately optimal choice for optimizing the operation of the computer program.

9 Claims, 3 Drawing Sheets

SYSTEM AND METHOD FOR AUTONOMIC OPTIMIZATION BY COMPUTER PROGRAMS

BACKGROUND OF THE INVENTION

1. Field of the Invention

The invention generally relates to computer-based optimization methods and systems, and more particularly to autonomic optimization techniques implemented to improve software design efficiency.

2. Description of the Related Art

Software engineers and computer scientists often have various alternate ways of implementing algorithms in software coding. Moreover, these software designers often fix choices within the code based on current beliefs about future environments in which the software will be run. For example, an on-line scheduling algorithm selects tasks for execution, attempting to optimize the system according to some criterion. However, the software code designer may not know what the best choices are in various situations. Quite often, the software code designer simply lacks the expertise that is required for making good choices. In many situations, the good choices depend on the environment and it is quite difficult to design, in advance, an algorithm that makes the best choices with respect to any environment. On the other hand, there are known methods for adapting choices to an environment by learning over time with feedback. However, one of the disadvantages of the conventional techniques is that a programmer must code a learning algorithm into the computer software program for each situation the software encounters. That is, there are no conventional automatic optimization techniques that use learning algorithms.

In view of the foregoing, there is a need for a method embedded in a software program, which allows the software program the ability to self-improve by making better choices with respect to the environment in which it functions.

SUMMARY OF THE INVENTION

The invention provides a system, method, and program storage medium for instructing a computer program to self-optimize comprising inputting, by using a compiler, commands into the computer program and allowing, by using a module, a learning protocol in the computer program to determine an optimal mode of operation of the computer program based on the commands. The commands comprise learning instructions. Specifically, the commands comprise operational choices for the computer program to select from, wherein the operational choices include an approximate optimal choice for optimizing the operation of the computer program. For example, the commands comprise a selection command operable for selecting any function in a list of instructions inputted into the computer program, wherein the function provides a basis of making the approximate optimal choice. Additionally, the commands comprise a rule command operable for instructing the computer program of how to make the approximate optimal choice. Moreover, the commands comprise a reward command operable for instructing the computer program which of the operational choices results in an approximate optimal choice for optimizing the operation of the computer program.

In another embodiment, the invention provides a method of autonomically optimizing a computer program comprising specifying at least one choice point in the computer program, defining a set of alternate choices at each choice point, setting at least one feedback point for each choice point, and allowing a learning protocol in the computer program determine an approximate optimal policy of operation of the computer program based on the steps of specifying, defining and setting, wherein the set of alternate choices comprise operational choices for the computer program to select from, wherein the operational choices include an approximate optimal choice for optimizing the operation of the computer program. Moreover, the method further comprises inputting a selection command into the computer program, wherein the selection command is operable for selecting any function in a list of instructions inputted into the computer program, wherein the function provides a basis of making an approximate optimal choice. Additionally, the method further comprises inputting a rule command into the computer program, wherein the rule command is operable for instructing the computer program of how to make an approximate optimal choice. Furthermore, the method further comprises inputting a reward command into the computer program, wherein the reward command is operable for instructing the computer program which of the operational choices results in an approximate optimal choice for optimizing the operation of the computer program.

Furthermore, the invention provides a system of autonomically optimizing a computer program comprising means for specifying at least one choice point in the computer program, means for defining a set of alternate choices at each choice point and means for setting at least one feedback point for each choice point. The invention provides a method how to incorporate any learning method automatically into a computer program.

Any repeating situation in which there is more than one way to do things (e.g., routing) can benefit from the invention. The invention addresses the need of allowing a software designer the capability to automatically have a computer program learn what would be the best choice of execution of a particular task or routine. Generally, the invention is a form of artificial intelligence whereby a computer software is instructed how to "learn" to choose near optimal choices for implementing commands, tasks, etc. The invention uses a series of protocols and modules for first providing a computer program instructions how to "learn" and then providing the computer program instructions how to "optimize" the task being sought by providing the computer program means for deciding which is the best choice for a particular solution.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
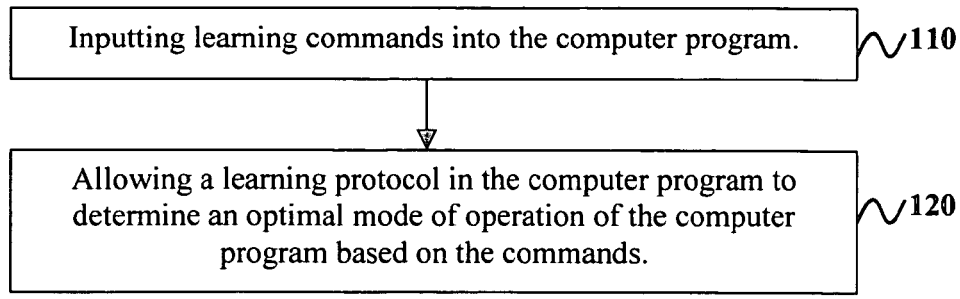
FIG. 1 is a flow diagram illustrating a preferred method of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

Figure 2:
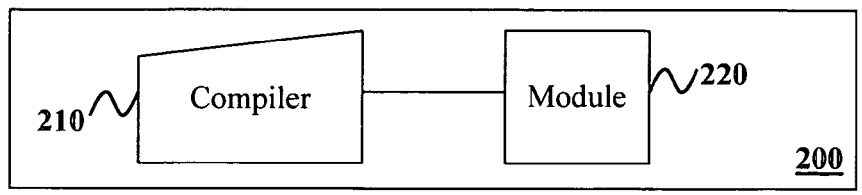
FIG. 2 is a flow diagram illustrating an alternative embodiment of the invention.

As mentioned, there is a need for a method embedded in a software program, which allows the software program the ability to self-improve by making better choices with respect to the environment in which it functions. Referring now to the drawings and more particularly to FIGS. 1 through 5, there are shown preferred embodiments of the invention. FIG. 1 illustrates a flow diagram of a preferred embodiment of the invention. FIG. 2 illustrates a system block diagram according to the invention. As shown in FIGS. 1-2, a method and system 200 of instructing a computer program to self-optimize comprises inputting 110, using a compiler 210, commands into the computer program and allowing 120, using a module 220, a learning protocol in the computer program to determine an approximate optimal policy of operation of the computer program based on the commands. The commands comprise learning instructions. Specifically, the commands comprise operational choices for the computer program to select from, wherein the operational choices include an approximate optimal choice for optimizing the operation of the computer program. For example, the commands comprise a selection command operable for selecting any function in a list of instructions inputted into the computer program, wherein the function provides a basis of making an approximate optimal choice. Additionally, the commands comprise a rule command operable for instructing the computer program of how to make an approximate optimal choice. Moreover, the commands comprise a reward command operable for instructing the computer program which of the operational choices results in an approximate optimal choice for optimizing the operation of the computer program.

Figure 3:
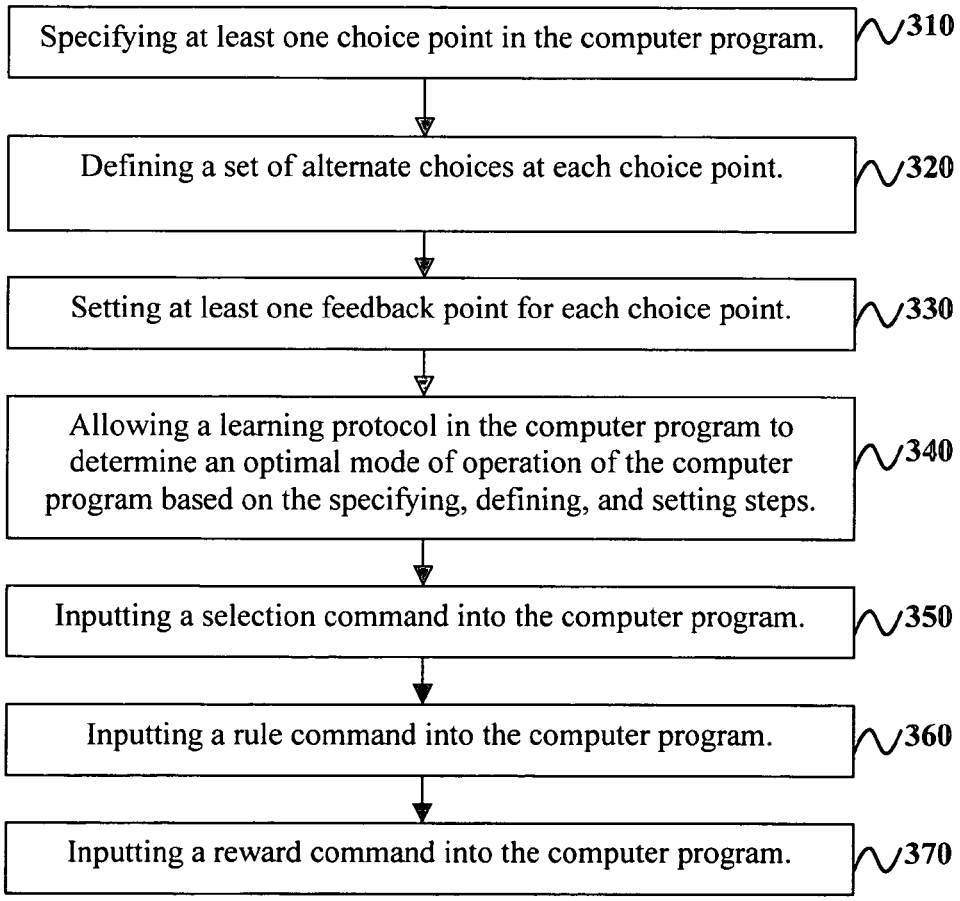
FIG. 3 is a system block diagram according to an embodiment of the invention.

In another embodiment shown in the flow diagram of FIG. 3, the invention provides a method of autonomically optimizing a computer program comprising specifying 310 at least one choice point in the computer program, defining 320 a set of alternate choices at each choice point, setting 330 at least one feedback point for each choice point, and allowing 340 a learning protocol in the computer program to determine an approximate optimal policy of operation of the computer program based on the steps of specifying 310, defining 320, and setting 330, wherein the set of alternate choices comprises operational choices for the computer program to select from, wherein the operational choices include an approximate optimal choice for optimizing the operation of the computer program. Moreover, the method further comprises inputting 350 a selection command into the computer program, wherein the selection command is operable for selecting any function in a list of instructions inputted into the computer program, wherein the function provides a basis of making an approximate optimal choice. Additionally, the method further comprises inputting 360 a rule command into the computer program, wherein the rule command is operable for instructing the computer program of how to make an approximate optimal choice. Furthermore, the method further comprises inputting 370 a reward command into the computer program, wherein the reward command is operable for instructing the computer program which of the operational choices results in an approximate optimal choice for optimizing the operation of the computer program.

The invention formulates a framework in which a software engineer endows the software program with the ability to improve itself by allowing the computer program to make better choices with respect to the environment in which it works. Many computer programs are used to control physical environments. For example, a program controls a queuing system by making decisions about which queue to serve next. Other examples of "environments" are electronic commerce systems where programs decide prices, production, and inventory systems where programs decide how much to produce, routing decisions in networks, etc.

In general, according to the invention, a programmer can code any possible way of executing a certain task of the software, and let the code later choose which particular alternative to execute. For example, the program may need to sort a set of objects and there exist various sorting algorithms. The performance of any sorting algorithms depends on the particular environment in which it runs, so the optimizing code can figure out the best choice of an algorithm for the environment. The invention allows the software designer to indicate the possibilities for adaptation and then to allow a learning algorithm find approximate optimal choices wherever the software designer thinks there is room for optimization. The programmer prepares all the places where learning can help adapt to the particular environment. The same code can run in different environments and in each environment the choices could be different. Optimization can be performed with respect to the choice of data structures, particular routines for standard tasks (like sorting), scheduling rules, assignment of tasks to executors, routing, etc.

Moreover, according to the invention, optimization refers to any situation where there is more than one possible way to carry out the same task, and there is a desire to select one of the ways which will lead to better performance. Thus, an approximate optimal choice will select the best alternative out of a choice of alternatives. The invention works by having a pre-compiler extract the learning instructions and to generate a program, for example a C program that includes all of the "learning components". The learning instructions include the various alternatives, the particular learning algorithm (the method of learning), and the parameters of the learning algorithm (for example, learning rate, the relative importance of the future, etc.). The "learning components" are all of the items that are specified for the compiler in connection to learning, which have to be incorporated into a running and learning C program. The system of the invention incorporates the suitable learning algorithms into the C program that results from what the programmer specifies. These algorithms are capable of learning when this augmented program runs in a real environment.

There are three sets of pre-compiler commands: the !CHOOSE command, the !RULES command, and the !REWARD command. Each command is discussed in turn. With respect to the !CHOOSE command, the execution of computer code is essentially deterministic, except in situations where probabilistic computations can be implemented with pseudo-random number generators. A probabilistic computation is one that relies on numbers produced by a random number generator.

The invention provides an extension to programming languages where the software engineer leaves some choices open so that the program can later make good (optimal) choices with respect to the environment in which the software runs. The program first runs in a "learning mode", where it explores the benefits of the various choices. After running in this mode, the program can enter the "optimized mode" where it actually uses the choices that were "learned" to be better choices, and thereby choosing an approximate optimal choice.

As such, a !CHOOSE command can be included in the program to be handled by a pre-compiler. The !CHOOSE command resembles the well known switch command in the C programming language, except that the processor is free to choose (at execution time) any one of the functions in the list between the !CHOOSE and the !ENDCHOOSE command and ignores the label and the parenthesized list of variables. Any choice should be "valid" even though not necessarily "optimal". The variables within the parentheses are used to encode a "state" which is suggested to the processor as a base for making the choice. In general, the computer memory configuration is constantly changing and its contents reflect the state of the execution and/or the "state" of the physical system that may be controlled by the software. The "state" is described by a set of state variables. For example, the number of customers waiting for service is one parameter of the state of a queuing system, and can form the basis for choosing what to do. In other words, according to the invention the program is able to learn over time what the good choices are with respect to observable quantities. For example, good choices in the above customer waiting example may include such things as minimizing processing time, minimizing memory usage, maximizing throughput, maximizing communication speed, improving accuracy, etc. Therefore, a particular routine is a follows:

```
!CHOOSE    label1
           (x1, x2, y1, y2)
           1: f1( );
           2: f2( );
           3: f3( );
!ENDCHOOSE
```

The observable quantities are any quantities that are encoded as variables of the program and/or quantities that describe the physical system, which may be controlled by the software.

Any one choice of a function results in a valid execution of the computer program, but may cause the program to perform differently and may yield different results. Therefore, the compiler 210 is instructed either to build a computer program that learns from its experience or make arbitrary choices (i.e., choose the first function in each case). According to the invention, the program can use any well-known learning algorithm. Generally, the rewards are tracked and associated with the choices. The choices that accumulate higher rewards are then picked more often. Again, the program is executed either in a "learning mode" or in an "optimized mode". While learning, the program balances between "exploration" i.e., making arbitrary choices, and "exploitation" which involves using, more often, the alternatives that have shown to be better choices. Furthermore, the user of the generated program can decide whether to continue learning or use the optimized mode.

With respect to the !RULES command, another pre-compiler feature is the capability of supplying specific rules of how to make a choice based on the state. This is particularly useful when the computer program has already gained some knowledge, and a small modification requires recompilation, so the knowledge can be passed to the revised program. One possible implementation of this feature is:

```
!RULES    label1    func( )
``` where label1 is the label of the choice point and func(x1, x2, x3) is a user-supplied function of the state variables of that decision point, which selects one of the available choices.

With respect to the !REWARD command, if a computer program is expected to optimize, it preferably is told what the goal is, or at the very least, be informed of rewards that are compatible with the goal. The goal may also be formulated quantitatively, but the learning algorithm uses only the rewards that are accumulated and are designed by the code designer to facilitate achieving the goal. This is analogous to training a pet to do something and rewarding behavior that is compatible with the goal. The reward mechanism may be implemented as follows. The command:

```
!REWARD    label1    func1( )
``` may be placed anywhere in the computer program. The command specifies which point of choice (e.g., label1) is rewarded and which user-supplied function (func1) is to be used for calculating the reward.

Next, if the pre-compiler is instructed to generate an optimizing program, then it generates, for example, a C program that incorporates learning algorithms (e.g., Q-learning, TD-learning, or any other well-known learning algorithm) for developing a good policy of making choices based on the current values of the state variables at each choice point. The programmer specifies the choice point. Thereafter, the pre-compiler expands each choice point into code, which incorporates calls to learning algorithms for optimizing the particular choice point.

An example of a learning technique is a follows. Suppose the state variables at a certain choice point are $s_1, \ldots, s_n$ and suppose a choice of function has to be made from the indices $1, \ldots, m$. The state variables may themselves be functions of other program variables, as the designer may wish. For example, the "value", V, of a choice $i(i-1, \ldots, m)$ at the state $s=(s_1, \ldots, s_n)$ is:

$$V(i, s) = \sum_{j=1}^{n} \alpha_{ij} s_j$$

where the $\alpha_{ij}$'s are supposed to be learned by the system. The linearity assumption is not too restrictive since the state variables themselves may be functions of other variables. The rewards associated with the choice point are used to update the current estimates of the coefficients $\alpha_{ij}$ that determine the V(i,s)'s The best choice at s is an i which maximizes V(i,s). However, during the learning phase the system explores different values of i and uses known learning algorithms for approximating the true values of the V(i,s)'s. The current $\alpha_{ij}$'s may be used for determining the actual choice of the algorithm (with respect to the state) once the learning phase has ended and the compiler 210 generates a deterministic program.

Figure 4:
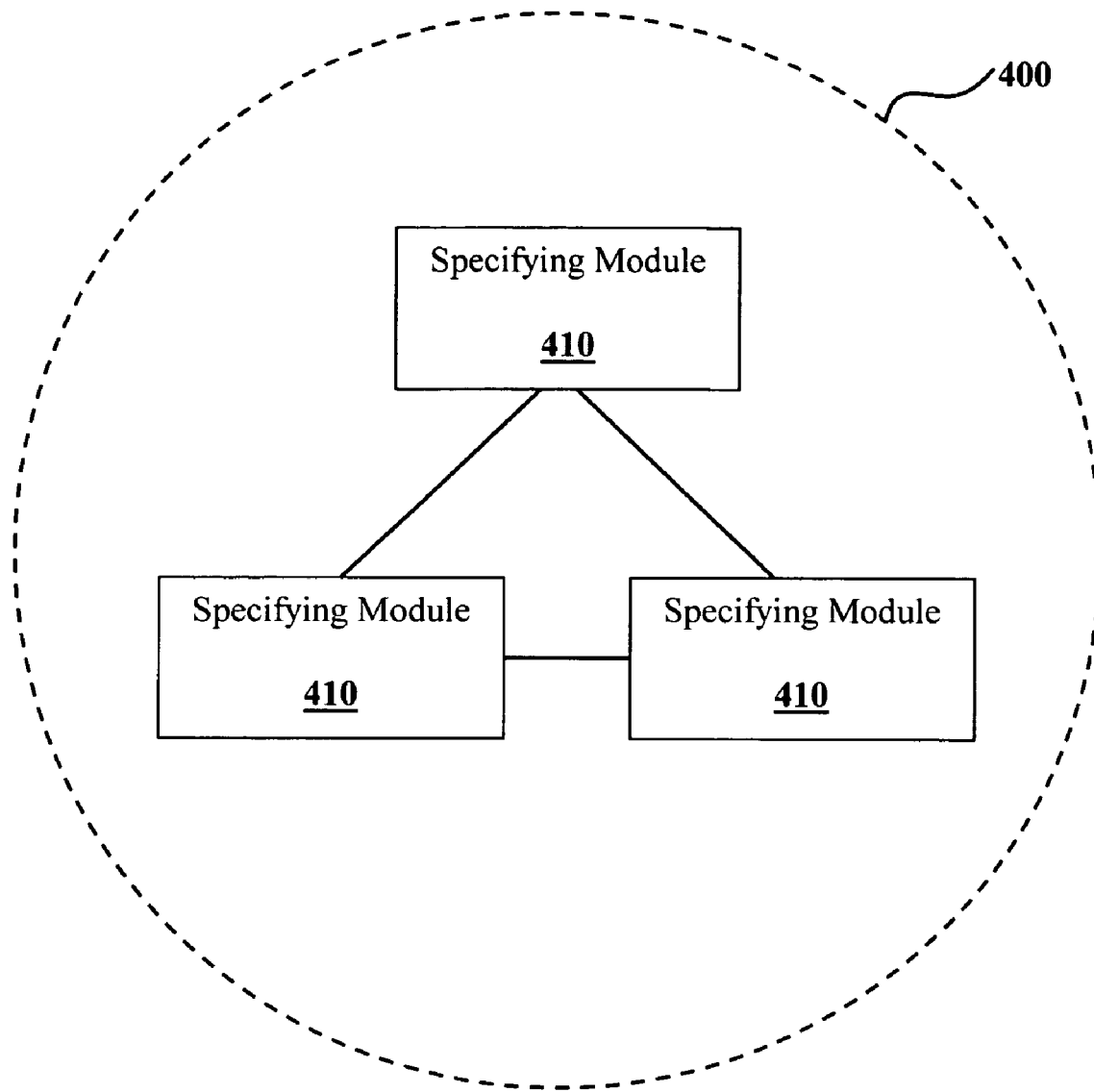
FIG. 4 is a system block diagram according to an embodiment of the invention.

In another embodiment of the invention, as illustrated in FIG. 4, a system 400 of autonomically optimizing a computer program comprises a specifying module 410 configured to specify at least one choice point in the computer program, a defining module 420 configured to define a set of alternate choices at each choice point, and a setting module 430 configured to set at least one feedback point for each choice point.

Figure 5:
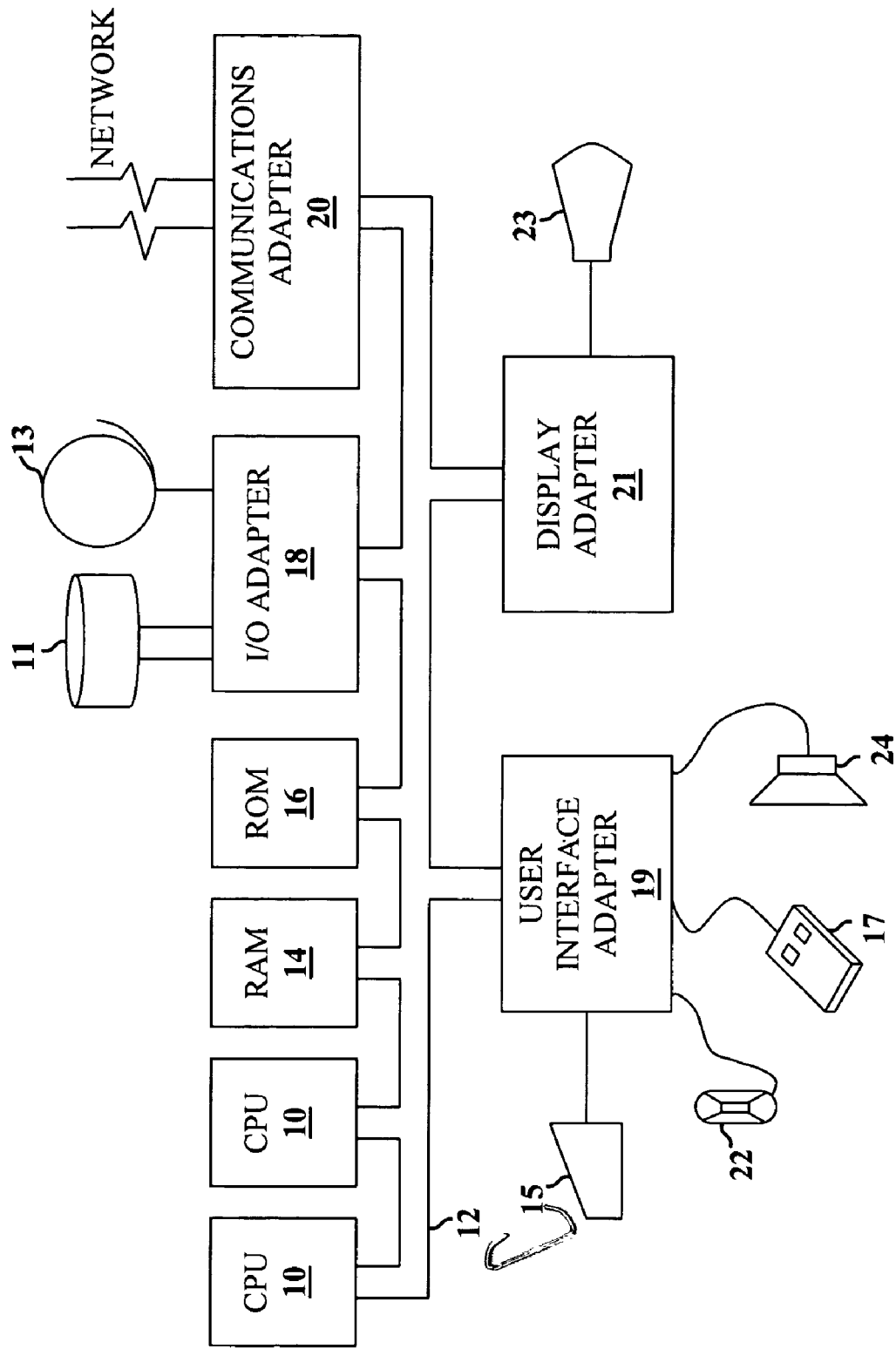
FIG. 5 is a system diagram according to the invention.

A representative hardware environment for practicing the present invention is depicted in FIG. 5, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

Any repeating situation in which there is more than one way to do things (e.g., routing) can benefit from the invention. The invention addresses the need of allowing a software designer the capability to automatically have a computer program learn what would be the best choice of execution of a particular task or routine. Generally, the invention is a form of artificial intelligence whereby a computer software is instructed how to "learn" to choose near optimal choices for implementing commands, tasks, etc. The invention uses a series of protocols and modules for first providing a computer program instructions how to "learn" and then providing the computer program instructions how to "optimize" the task being sought by providing the computer program means for deciding which is the best choice for a particular solution.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of instructing a computer program to self-optimize, said method comprising: inputting a selection command that selects one function from a list of pre-selected functions for input into said computer program at a point of choice determined by a programmer, wherein each function from said list of pre-selected functions is associated with a reward; and allowing a learning protocol comprised of learning instructions in said computer program to track and reward said one function that is selected and to determine an approximate optimal choice of operation of said computer program based on said selection command and further comprising inputting a reward command that provides a reward, at a point of choice, determined by a programmer, in said computer program, for said one function selected by said selection command, which results in said approximate optimal choice for self-optimizing said computer program.

2. The method of claim 1, further comprising inputting a rule command that establishes a rule for said computer program on how to determine said approximate optimal choice of operation.

3. A method of optimizing a computer program, said method comprising: specifying at least one point of choice, determined by a programmer, in said computer program; defining a set of alternate choices at each point of choice, wherein said set of alternate choices include operational choices comprising: inputting a selection command that selects one function from a list of pre-selected functions for input into said computer program, wherein each function from said list of preselected functions is associated with a reward; allowing a learning protocol comprised of learning instructions in said computer program to track and reward said one function that is selected to determine an approximate optimal operation of said computer program based on said selection command; and setting at least one feedback point for said each point of choice; and wherein said set of alternate choices include operational choices, and wherein said method further comprises: inputting a reward command into said computer program at a point of choice, determined by a programmer, wherein said reward command provides reward in said computer program for said one function selected by said selection command, which results in said approximate optimal choice for optimizing said computer program.

4. The method of claim 3, further comprising allowing a learning protocol in said computer program to determine an approximate optimal operation of said computer program based on said specifying, defining, and setting.

5. The method of claim 4, wherein said set of alternate choices include operational choices, further comprising:
inputting a rule command into said computer program, wherein said rule command establishes a rule on how to determine said approximate optimal operation.

6. A program storage device readable by computer, tangibly embodying a program of instructions executable by said computer to perform a method of instructing a computer program to self-optimize, said method comprising: inputting a selection command that selects one function from a list of pre-selected functions for input into said computer program at a point of choice, determined by a programmer, wherein each function from said list of pre-selected functions is associated with a reward; and allowing a learning protocol comprised of programmer determined learning instructions in said computer program to track and reward said one function that is selected and to determine an approximate optimal choice of operation of said computer program based on at least said selection command and further comprising inputting a reward command that provides a reward, at a point of choice, determined by a programmer, in said computer program, for said one function selected by said selection command, which results in said approximate optimal choice for self-optimizing said computer program.

7. The program storage device of claim 6, further comprising inputting a rule command that establishes a rule for said computer program on how to determine said approximate optimal choice of operation.

8. A computer system comprising: a memory encoding a computer program; a pre-compiler that inputs a selection command at a point of choice, determined by a programmer, into a said computer program that runs on a computer, said selection command selecting one function from a list of pre-selected functions for input into said computer program, wherein each function from said list of pre-selected functions is associated with a reward; and a processor adapted to execute a learning protocol comprised of learning instructions in said computer program to track and reward said one function that is selected and determine an approximate optimal choice of operation of said computer program based on at least said selection command; and wherein said pre-compiler further inputs a reward command that provides a reward, at a point of choice, determined by a programmer, in said computer program, for said one function selected by said selection command, which results in said approximate optimal choice for self-optimizing said computer program.

9. The system of claim 8, wherein said pre-compiler further inputs a rule command into said computer program that runs on said computer, said rule command establishing a rule for said computer program on how to determine said approximate optimal choice of operation.

* * * * *